Patented Nov. 19, 1940

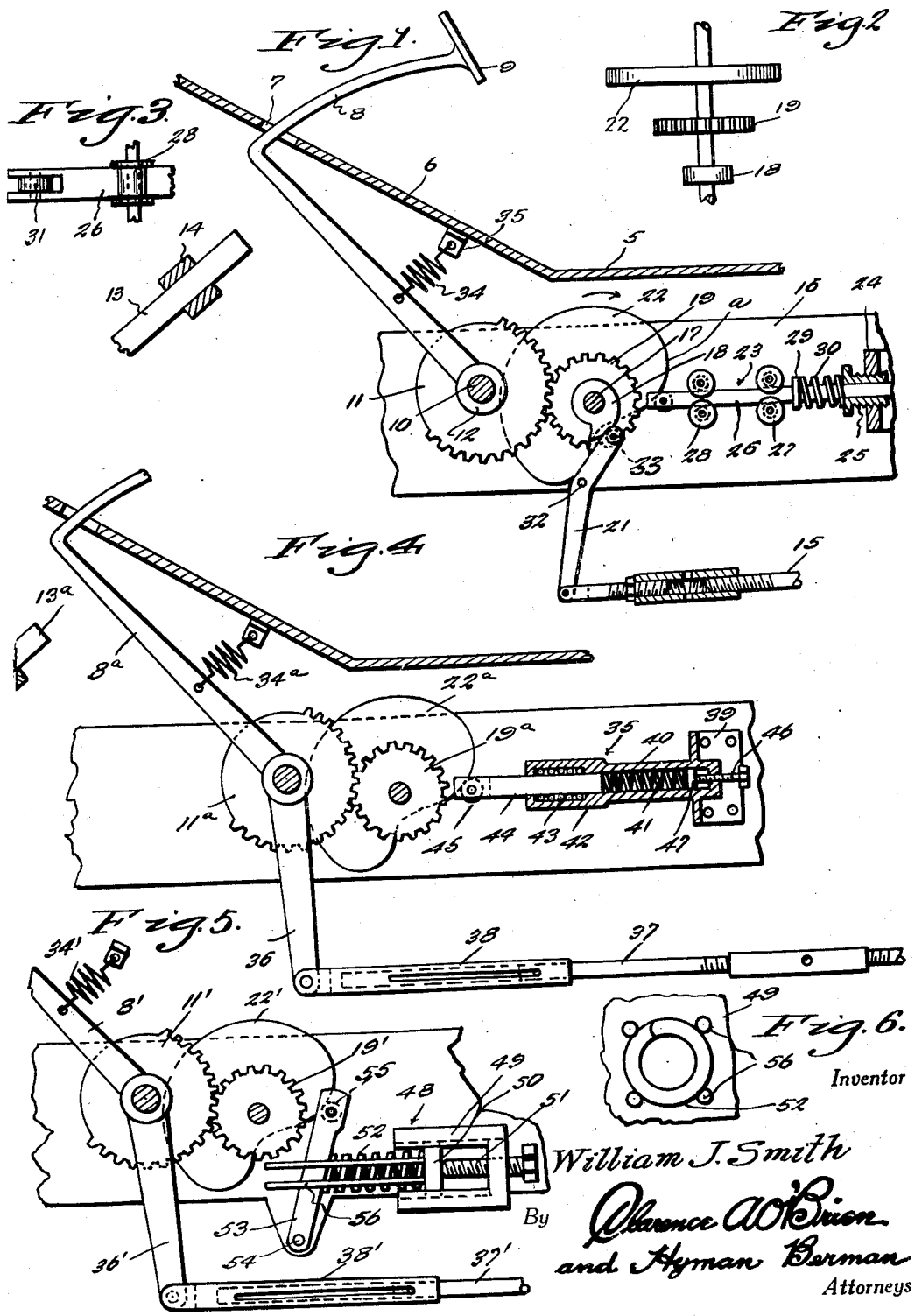

2,222,379

UNITED STATES PATENT OFFICE 2,222,379

COMBINED ACCELERATOR AND BRAKE CONTROL

William J. Smith, Delaware City, Del.

Application February 4, 1939, Serial No. 254,695

15 Claims. (Cl. 192—3)

The present invention appertains to new and useful improvements in controls for operating the usual accelerator and brakes of a land vehicle, such as an automobile.

The principal object of this invention is to provide control means for accelerators and brakes wherein a single manually operated member is used to effect operation of either the accelerator or brake mechanisms.

Another important object of the invention is to provide a control of the character stated employing a single manually operated member which can be freely operated in one direction to actuate the accelerator mechanism and which will be automatically operated in the opposite direction to effect operation of the brake mechanism.

These and other objects and advantages of the invention will readily become apparent to the reader of the following specification.

In the drawing:

Figure 1 represents a sectional view through the floor and toe boards of a vehicle and principally showing the mechanism of the invention in side elevation.

Figure 2 is a fragmentary top plan view of the cams unit.

Figure 3 is a fragmentary top plan view of the spring operated plunger.

Figure 4 is a sectional and elevational view similar to that shown in Figure 1, but showing a slightly modified form of the invention.

Figure 5 is a side elevational view fragmentarily showing still another form of the invention.

Figure 6 is a fragmentary end elevational view showing the force applying means.

Referring to the drawing wherein like numerals designate like parts, it can be seen that numeral 5 denotes the usual floor board of the vehicle from which extends the toe board 6 through which there is an opening 7 to accommodate the arm 8 of the foot pedal 9.

The lower portion of the arm 8 is operative on the stub shaft 10 and has a mutilated gear 11 carried by the hub 12 thereof.

Numeral 13 designates a plunger operative through the guide 14 for operating the usual accelerator mechanism (not shown). This plunger 13 is in the path of the arm 8, so that when the arm 8 is depressed under foot pressure and presses against the plunger 13 the accelerator is operated.

Numeral 16 denotes the usual chassis frame of an automobile or other vehicle and journaled for rotation on this frame 16 is the shaft 17 to which the small cam 18, gear 19 and large cam 22 are positively secured. The gear 19 meshes with the mutilated gear 11, the small cam 18 operating on the rocker 21 and the large cam 22 being in constant contactual relation with the force applying means generally referred to by numeral 23.

The large cam 22 is of general heart-shape, the force applying means 23 being operative against the same to rotate the shaft 17 to swing the small cam 18 to operate the rocker 21 and brake line 15.

It can be seen that a suitable bracket 24 is mounted on the chassis frame 16 and has a threaded guide bushing 25 driven into the same for slidably receiving the plunger rod 26, this plunger rod operating between two sets of guide rollers 27 and 28. A fixed collar 29 is provided on the plunger 26 and between this and the bushing 25 is located the force applying spring 30.

The forward end of the plunger 26 as shown in Figure 3 is bifurcated and has the roller 31 mounted therein, the terminal portions of the furcations straddling the large cam 22 to prevent displacement of the roller 31 from the cam 22.

The rocker 21 is fulcrumed as at 32 and carries a roller 33 at its upper end for riding engagement with the small cam 18.

A coiled tension spring 34 has one end connected to the lower portion of the arm 8 while its other end is connected to the bracket 35 secured to the underside of the toe board 6.

It can now be seen that when the pedal 9 is moved downwardly the gears 11 and 19 serve to rotate the large cam 22 in the direction of the arrow which results in the rotation of the cam 22 to a point where the roller 31 of the force applying means 23 is located beyond the crest a of the cam and the crest of the small cam 18 has removed itself to a point where the brake line 15 is unaffected and the brake mechanism is in unapplied position. In this position of the pedal 9 the arm is in position to effect pressure against the accelerator plunger 13 with the brake mechanism in fully unapplied position. When it is desired to apply the brakes suddenly or gradually the driver may release foot pressure suddenly or gradually and the mechanism will operate to the extent that the spring 34 will return the arm 8 and rotate the gears 11 and 19 to an extent where the large cam 22 will have rotated to a point with the force applying means roller 31 on the effective side of the cam crest a. The force applying means 23 now functions on its own inherent effectiveness, the spring 30 which has been up until now under compression, forcing the plunger 26 forwardly and causing rotation of the large cam 22 in the reverse direction as the roller 31 rides toward the valley of the heart-shaped cam 22. This forced rotation of the cam 32 of course carries with it the small cam 18, the crest of which in riding against the roller 33 of the rocker 21, rocks the rocker 21 to effect a pull on the brake line 15 with the result that the brake mechanism is operated automatically without any reliance on exertion on the part of the driver.

In Figure 4, a slightly modified form of the invention, the pedal arm 8a, gear 11a, large cam 22a, gear 19a and spring 34a are employed in the same capacity as the corresponding parts above described. In this form (Figure 4) the force applying means generally referred to by numeral 35 is somewhat different from the force applying means 23 and instead of having the rocker 21, an arm 36 depends directly from the hub of the gear 11a and is connected to the brake line 37 by a slip type coupling 38.

The force applying means 35 consists of the bracket 39 from which extends the barrel 40 and in which is the compression spring 41. The barrel 40 has a head portion 42 counterbored to receive anti-frictional means 43 which act against the plunger 44, the latter being bifurcated at its forward end and at this end receiving the roller 45 which rides the cam 22a.

Through the rear end of the barrel 40 is feedably disposed the adjusting screw 46 which is feedable against the follower 47, the compression spring 41 being interposed between the follower 47 and the plunger 44.

In this form of the invention (Figure 4), the drive from the force applying means 35 is through the cam 22a, gear 19a, to the cam 11a and from there by way of the arm 36 to the brake line 37, and the function of the spring 34a is the same in that this spring serves to actuate the gears and cam 22a to initially rotate the cam 22a so that the cam 22a is positioned with the roller 45 on the effective side of the crest of the same for brake mechanism operation.

A third form of the invention is shown in Figure 5 wherein the pedal arm is denoted by reference character 8', this arm serving to rotate the mutilated gear 11', the gear 19' and large heart-shaped cam 22'. The pedal arm spring 34' has the same purpose and function as the spring 34. Also in this form of the invention the arm 36' is shown extending directly from the gear 11' and the brake line 37' is shown connected to this arm 36' by the slip type coupling 38'.

The modification of this form of the invention shown in Figure 5 over the form of the invention shown in Figure 4 resides in the force applying means generally referred to by numeral 48. This force applying means 48 consists of the U-shaped guide frame 49 which is suitably grooved to receive the slide block 50 against which the adjusting screw 51 is feedable to adjust the tension of the compression spring 52. This compression spring 52 is interposed between the block 50 and the swingable arm 53, the latter being pivoted as at 54 and having its upper end bifurcated to receive the roller 55. The bifurcated end of this arm 53 straddles the edge portion of the cam 22' to prevent displacement of the roller 55 from the cam.

A plurality of guard rods 56 extend forwardly from the slide block 50 and straddle the arm 53, with the result that the arm 53 is guided and the spring 52 has no chance of losing its effective tension through lateral bulging. The action of the roller 55 on the heart-shaped cam 22' is the same as specified in regard to the action of the force applying means against the cams 22 and 22a.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A brake control comprising a manual control member, a force applying unit, a rotatable cam against which the force applying unit is operative to rotate the cam when manual effort is relieved from the manual control, a brake operator, and drive means between the cam and the brake operator.

2. A brake control comprising a manual control member, a force applying unit, a rotatable cam against which the force applying unit is operative to rotate the cam when manual effort is relieved from the manual control, a brake operator, and drive means between the cam and the brake operator, said cam being in driving relation with the said manual control member.

3. A brake control comprising a manual control member, a force applying unit, a rotatable cam against which the force applying unit is operative to rotate the cam when manual effort is relieved from the manual control, a brake operator, and drive means between the cam and the brake operator, and spring means associated with the control member to initially rotate the cam to that portion of the latter where the force of the force applying unit will start to take effect.

4. A brake control comprising a manual control member, a force applying unit, a rotatable cam against which the force applying unit is effective to rotate the cam when manual effort is relieved from the manual control, a brake operator, and means between the cam and the brake operator, and gear means between the cam and the manual control member.

5. A brake control comprising a manual control member, a force applying unit, a rotatable cam against which the force applying unit is effective to rotate the cam when manual effort is relieved from the manual control, a brake operator, and means between the cam and the brake operator, said drive means consisting of an auxiliary cam driven by the first mentioned cam for driving the said brake operator.

6. In combination, a brake operator, a manual control member, a rotatable cam, force applying means effective against the cam to rotate the same when the manual control member is released, and drive means between the cam and the brake operator, and spring means associated with the manual control member for rotating the cam to a position where the force applying unit will start taking effect.

7. In combination, a brake operator, a manual control member, a rotatable cam, force applying means effective against the cam to rotate the same when the manual control member is released, and drive means between the cam and the brake operator, and spring means associated with the manual control member for rotating the cam to a position where the force applying unit will start taking effect, said drive means between the cam and the brake operator consisting of a rocker having one end connected to the brake operator and an auxiliary cam driven by the first mentioned cam and against which the opposite end of the rocker rides.

8. In combination, a brake operator, a manual control member, a cam, force applying means adapted to effect force against the cam, a driving connection between the cam and the manual control member, drive means between the cam and the brake operator, and spring means associated with the manual control member for starting rotation of the cam after foot pressure has been relieved, to position the cam with the force applying unit taking effect on the effective side on the crest of the cam, and drive means between the cam and the brake operator.

9. In combination, a brake operator, a manual control member, a cam, force applying means adapted to effect force against the cam, a driving connection between the cam and the manual control member, drive means between the cam and the brake operator, and spring means associated with the manual control member for starting rotation of the cam after foot pressure has been relieved, to position the cam with the force applying unit taking effect on the effective side of the crest of the cam, and drive means between the cam and the brake operator, said drive means consisting of an auxiliary cam driven by the first-mentioned cam and a rocker, one end of the rocker being connected to the brake operator and the other end riding the auxiliary cam.

10. A brake control comprising a manual control member, a force applying unit, a rotatable cam against which the force applying unit is effective to rotate the cam when manual effort is relieved from the manual control, a brake operator, and means between the cam and the brake operator, said force applying unit consisting of a plunger operative at one end against the cam and spring means for forcing the plunger in the direction of the cam.

11. A brake control comprising a manual control member, a force applying unit, a rotatable cam against which the force applying unit is effective to rotate the cam when manual effort is relieved from the manual control, a brake operator, and means between the cam and the brake operator, said force applying unit consisting of a plunger operative at one end against the cam and spring means for forcing the plunger in the direction of the cam, and roller guide means for the said plunger.

12. A brake control comprising a manual control member, a force applying unit, a rotatable cam against which the force applying unit is effective to rotate the cam when manual effort is relieved from the manual control, a brake operator, and means between the cam and the brake operator, said force applying means consisting of a barrel having a plunger operative from one end thereof and against the cam, and spring means in the barrel exerting pressure against the adjacent end of the plunger, a follower in the barrel and screw means for feeding the follower against the spring to adjust the pressure thereof.

13. A brake control comprising a manual control member, a force applying unit, a rotable cam against which the force applying unit is effective to rotate the cam when manual effort is relieved from the manual control, a brake operator, and means between the cam and the brake operator, said force applying means consisting of a frame having a follower block therein, a screw operative against the follower block, a swingable arm having its free end effectively engaged with the cam, and spring means between the follower block and the arm.

14. A brake control comprising a manual control member, a force applying unit, a rotatable cam against which the force applying unit is effective to rotate the cam when manual effort is relieved from the manual control, a brake operator, and means between the cam and the brake operator, said force applying means consisting of a frame having a follower block therein, a screw operative against the follower block, a swingable arm having its free end effectively engaged with the cam, and spring means between the follower block and the arm, and guide rods extending from the follower block to straddle the arm and embrace the spring.

15. A brake control comprising a manual control member, a force applying unit, a rotatable cam against which the force applying unit is effective to rotate the cam when manual effort is relieved from the manual control, a brake operator, and means between the cam and the brake operator, said means consisting of an auxiliary cam driven by the first-mentioned cam and a rocker having one end connected to the brake operator and the other end riding the auxiliary cam.

WILLIAM J. SMITH.